United States Patent [19]

Kuramoto et al.

[11] Patent Number: 4,618,592
[45] Date of Patent: Oct. 21, 1986

[54] FINE POWDER OF ALUMINUM NITRIDE, COMPOSITION AND SINTERED BODY THEREOF AND PROCESSES FOR THEIR PRODUCTION

[75] Inventors: Nobuyuki Kuramoto, Sagamihara; Hitofumi Taniguchi, Chigasaki, both of Japan

[73] Assignee: Tokuyama Soda Kabushiki Kaisha, Yamaguchi, Japan

[21] Appl. No.: 588,773

[22] Filed: Mar. 12, 1984

Related U.S. Application Data

[63] Continuation-in-part of Ser. No. 532,591, Sep. 15, 1983, abandoned.

[30] Foreign Application Priority Data

Sep. 17, 1982 [JP] Japan .............................. 57-160782
Sep. 17, 1982 [JP] Japan .............................. 57-160783
May 13, 1983 [JP] Japan .............................. 58-82536

[51] Int. Cl.[4] .......................... C04B 35/58; F27D 7/06
[52] U.S. Cl. ........................................ 501/96; 264/61; 264/66; 423/412
[58] Field of Search ................ 501/96, 127, 97, 98; 423/412; 264/66

[56] References Cited

U.S. PATENT DOCUMENTS 2,962,359 11/1960 Perieres et al. ................... 423/412
3,108,887 10/1963 Lenie et al. ........................... 501/96
3,572,992  3/1971 Komeya et al. ................... 423/412
3,718,490  2/1973 Morgan et al. .................... 423/412

FOREIGN PATENT DOCUMENTS 126697 10/1979 Japan ................................ 423/412

OTHER PUBLICATIONS

Aluminum Nitride, Engineered Materials, division of Hi-Purity Materials, Inc., N.Y., N.Y.–Jun., 1981.
Mat. Sci. Res. 13, 321-332 (1980), Sintering of Aluminum Nitride.
Publication Yogyo Kyokai Shi, 82[3], 181-183 (1974).
Publication Yogyo Kyokai Shi, 89[6], 58-64 (1981).

*Primary Examiner*—Howard S. Williams
*Attorney, Agent, or Firm*—Wenderoth, Lind & Ponack

[57] ABSTRACT

A fine powder of aluminum nitride having an average particle diameter of not more than 2 microns and comprising at least 94% by weight of aluminum nitride, at most 3% by weight of bound oxygen and at most 0.5% by weight as metal of metal compounds as impurities.

The fine aluminum nitride powder is prepared from a fine alumina powder and a fine carbon powder as starting materials.

The fine aluminum nitride powder provides a sintered body having a high purity and a high density such as at least 2.9 g/cm$^3$.

The fine aluminum nitride powder is also useful as a raw material for alpha-Sialon, beta-Sialon and AlN polytypes, as an addition aid in various ceramics.

36 Claims, 7 Drawing Figures

FINE POWDER OF ALUMINUM NITRIDE, COMPOSITION AND SINTERED BODY THEREOF AND PROCESSES FOR THEIR PRODUCTION

This application is a continuation-in-part application of U.S. patent application Ser. No. 532,591 filed on Sept. 15, 1983, now abandoned.

This invention relates to a fine powder of highly pure aluminum nitride, a composition thereof and a sintered body thereof, and to processes for their production.

Sintered aluminum nitride has attracted continued interest as various high temperature materials for its excellent properties such as high thermal conductivity, corrosion resistance and strength. Since aluminum nitride powders for sintered aluminum nitride inevitably contain various impurities depending upon methods of its production, their sinterability is not sufficient, and it is difficult to give compact sintered bodies and highly pure sintered bodies having the inherent excellent properties of aluminum nitride.

The following two methods have previously been known for the production of aluminum nitride powders. A first method is called a direct nitriding method which comprises nitriding metallic aluminum powder at high temperatures in an atmosphere of nitrogen or ammonia gas and pulverizing the resulting nitride. A second method is called an alumina reducing method and comprises firing alumina and carbon powder in nitrogen or ammonia gas and pulverizing the resulting nitride.

Since metallic aluminum is used as a starting material in the first direct nitriding method, it naturally requires a step of pulverizing metallic aluminum in order to increase the rate of nitridation. Furthermore, in order to increase the sinterability of the resulting nitride, it requires a step of pulverizing the nitride to a particle size of less than several microns. It is not too much to say that in the direct nitriding method, it is impossible to avoid inclusion of metals or metallic compounds as impurities from pulverizing means such as a ball mill used in these pulverizing steps. Furthermore, because the direct nitriding method gives aluminum nitride powder inevitably containing unreacted metallic aluminum as an impurity, it is extremely difficult to produce aluminum nitride containing less than several % by weight of impurities including those occurring in the pulverizing steps. In the pulverizing step of the direct nitriding method, it is difficult to produce aluminum nitride powder having a sufficiently small and uniform particle size, and moreover, since oxidation of the surface of aluminum nitride powder during pulverization cannot be avoided, the aluminum nitride powder obtained by the direct nitriding method usually contains 2 to 5% by weight or even more of oxygen.

The second alumina reducing method is generally considered to be better than the direct nitriding method in that it gives an aluminum nitride powder having a relatively uniform particle size. But to obtain particles having a size of less than several microns, the performance of a pulverizing step cannot be obviated. Furthermore, the content of unreacted alumina cannot be reduced to an extreme extent. Accordingly, like the direct nitriding method, the second method also has the defect of giving an aluminum nitride powder of low purity. Aluminum nitride powders produced by these methods do not have a sufficient purity, and generally assume a black to gray color. Usually, therefore, sintered bodies obtained from these powders, do not at all have light-transmitting properties.

It is an object of this invention therefore to provide a fine powder of aluminum nitride having a high purity.

Another object of this invention is to provide a fine powder of aluminum nitride having a high purity, which is composed of very fine particles having an average particle diameter of not more than 2 microns and has a very low content of impurities such as metallic compounds and a very low content of bound oxygen.

Still another object of this invention is to provide a fine powder of aluminum nitride having a high purity which has excellent sinterability and gives a sintered body of aluminum nitride having a high purity and a high density.

Still another object of this invention is to provide an industrially advantageous process for producing highly pure aluminum nitride of this invention.

Still another object of this invention is to provide a process for producing a fine powder of aluminum nitride having high purity, which is in accordance with a so-called alumina reducing method but which can give a fine powder of aluminum nitride having an average particle diameter of not more than 2 microns without subjecting the resulting nitride to a pulverization step.

Still another object of this invention is to provide a compact aluminum nitride composition comprising the highly pure aluminum nitride of this invention and a sintering aid, and a process for its production.

Still another object of this invention is to provide a sintered body of aluminum nitride having a high purity and a high density.

Still another object of this invention is to provide a sintered body of aluminum nitride having a high purity and a high density, which has very low levels of content of metal compounds as impurities and bound oxygen and of which density is at least about 90% of theory.

Still another object of this invention is to provide a sintered body of aluminum nitride having a high purity and a high density which has light-transmitting properties.

Still another object of this invention is to provide a process for producing a sintered body of aluminum nitride having a high purity and a high density from the fine powder of aluminum nitride of the invention having a high purity or the aluminum nitride composition of the invention.

Other objects and advantages of this invention will become apparent from the following description.

According to this invention, such objects and advantages are achieved firstly by a fine powder of aluminum nitride which has an average particle diameter of not more than 2 microns and comprises at least 94% by weight of aluminum nitride (AlN), at most 3% by weight of bound oxygen and at most 0.5% as metal of metal compounds as impurities.

The fine powder of aluminum nitride having an average particle diameter of not more than 2 microns in accordance with this invention exists in the form of spherical particles or secondary agglomerates thereof.

According to this invention, the fine powder of aluminum nitride can be produced by a process which comprises (1) intimately mixing a fine powder of alumina having an average particle diameter of not more than 2 microns with a fine powder of carbon having an ash content of at most 0.2% and an average particle diameter of not more than 1 micron in a liquid dispersing medium, the weight ratio of the fine alumina powder to the fine carbon powder being from 1:0.36 to 1:1, (2) firing the resulting intimate mixture at a temperature of 1,400° to 1,700° C. in an atmosphere of nitrogen or ammonia after optionally drying it, and (3) thereafter heating the resulting fine powder at a temperature of 600° to 900° C. to remove the unreacted carbon, thereby forming a fine powder of aluminum nitride having an average particle diameter of not more than 2 microns and containing an at least 94% by weight of aluminum nitride, at most 3% by weight of bound oxygen and at most 0.5% by weight, calculated as metal, of metal compounds as impurities.

According to the above process, the performance of a step of pulverizing aluminum nitride obtained by firing the raw material can be obviated. Hence, no impurity attributed to the pulverizing step is included in the resulting aluminum nitride, and oxidation of the surface of aluminum nitride which occurs during pulverization in the prior art can be prevented. Accordingly, the advantage of omitting the step of pulverizing aluminum nitride is unexpectedly great. In order to omit the pulverizing step and obtain aluminum nitride having good properties, it is important to employ a so-called wet mixing method by which the mixing of the alumina powder and the carbon powder in the aforesaid step (1) is carried out in a liquid dispersing medium. According to the wet mixing method, not only the materials can be mixed intimately, but also unexpectedly, the tendency of the particulate starting materials to be agglomerated and coarsened can be prevented. Firing of the resulting intimate mixture results in aluminum nitride particles of a fine and uniform size. In addition, since according to the process of this invention, the inclusion of impurities in the pulverizing step, etc. can be completely prevented and the oxidation of the surface of aluminum nitride can also be prevented, there can be obtained a fine powder of aluminum nitride having better sinterability than in the conventional methods, which gives a sintered body having high purity and light-transmitting property. There is no particular restriction on the liquid dispersing medium used in the wet mixing step, and any known media for wet mixing can be used. Generally, water, hydrocarbons, aliphatic alcohols, and mixtures of these are conveniently employed in industrial operations. The hydrocarbons include, for example, ligroin, petroleum ether, hexane, benzene, and toluene, and the aliphatic alcohols include, for example, methanol, ethanol and isopropanol.

Preferably, the above wet mixing is carried out in a device made of a material which does not cause inclusion of impurities in the fired aluminum nitride. Generally, the wet mixing can be carried out at room temperature and atmospheric pressure, and is not adversely affected by temperature and pressure. Known mixing devices can be employed so long as they do not generate impurities which remain in the product after firing. Generally, a mill containing spherical or rod-like materials is generally used as the mixing device. Preferably, the inner wall of the mill and the spherical or rod-like materials are made of aluminum nitride itself or highly pure alumina having a purity of at least 99.9% by weight in order to avoid inclusion of impurities which remain in the fired aluminum nitride. That surface of the mixing device which contacts the starting materials may be made of, or coated with, plastics. There is no particular limitation on the plastics used for this purpose, and for example, polyethylene, polypropylene, polyamides, polyesters and polyurethane may be used. Since various metallic stabilizers are used in the plastics, they must be checked before use. Furthermore, in order to omit the pulverizing step and to obtain a highly pure fine powder of aluminum nitride having an average particle of not more than 2 microns and good sinterability, it is important to use alumina and carbon having specified characteristics. The fine alumina powder used should have an average particle diameter of not more than 2 microns and a purity of at least 99.0% by weight, preferably at least 99.8% by weight. The fine carbon powder should have an ash content of 0.2% by weight at most, preferably 0.1% by weight at most. Since the average particle diameter of carbon affects the particle diameter of aluminum nitride to be obtained, carbon should be as a fine powder of submicron size, namely having an average particle diameter of not more than 1 micron. Carbon black and graphitized carbon black may be used, but carbon black is generally preferred.

Since the ratio of alumina and carbon differs depending upon the purities, particle sizes, etc. of alumina and carbon, it should preferably be determined by conducting preliminary tests. Usually, alumina and carbon are wet-mixed at a weight ratio of from 1:0.36 to 1:1, preferably from 1:0.4 to 1:1. The mixture is dried as required, and fired at a temperature of 1,400° to 1,700° C. in an atmosphere of nitrogen. When the firing temperature is below the above specified limit, reductive nitridation reaction does not proceed industrially satisfactorily. If the firing temperature exceeds the above-specified upper limit, the resulting aluminum nitride partly undergoes sintering to form agglomerated particles. Hence, aluminum nitride having the desired particle diameter are difficult to obtain.

According to the present invention, the fine particles of aluminum nitride obtained by firing are then heated at a temperature of 600° to 900° C. in an atmosphere containing oxygen to oxidize the unreacted carbon and remove it.

As a result, the invention provides a fine powder of highly pure aluminum nitride which has an aluminum nitride content of at least 94%, a bound oxygen content of 3% by weight at most and an impurity content of 0.5% by weight (as metal) at most.

The highly pure fine powder of aluminum nitride in accordance with this invention has an aluminum nitride content of at least 94%. A preferred fine powder of aluminum nitride having at least 97% by weight of aluminum nitride gives a sintered body having particularly good light-transmitting property.

The fine aluminum nitride powder of this invention has a bound oxygen content of at most 3% by weight and an impurity content of at most 0.5% by weight (as metal). Bound oxygen is believed to exist in a form bound to metals included as impurities or in the form of aluminum oxide.

The bound oxygen content and the impurity content greatly affect the sinterability of aluminum nitride and the light-transmitting property of the resulting sintered body. Preferably, the bound oxygen content is at most 1.5% by weight, and the impurity content is at most 0.3% by weight (as metal).

Metal compounds as impurities may come from impurities contained in alumina and carbon as raw materials for production of aluminum nitride, or from solvents, mixing devices, pipings, etc. during the manufacturing process. They are compounds of carbon, silicon, manganese, iron, chromium, nickel, cobalt, copper, zinc, and titanium. In addition, the impurities may be compounds of carbon or silicon.

The content of such metal compounds in the fine aluminum nitride powder is especially preferably 0.1% by weight (as metal) at the highest.

Among these impurities, the unreacted alumina and carbon, and aluminum oxide formed by oxidation of the surface of aluminum nitride do not extremely aggravate the properties of the aluminum nitride of this invention. For example, the inclusion of cationic impurities such as alumina, carbon and silica in an amount of about 0.3 to 0.5% by weight does not adversely affect the sinterability of aluminum nitride under atmospheric pressure. On the other hand, since iron, chromium, nickel, cobalt, copper and titanium as impurities adversely affect the light-transmitting property of a sintered body of aluminum nitride, the inclusion of these components should be minimized. In order to impart sufficient light-transmitting property to sintered aluminum nitride, the fine aluminum nitride powder of this invention preferably contains only less than 0.1% by weight in total of iron, chromium, nickel, cobalt, copper and titanium.

The fine aluminum nitride powder of this invention has an average particle diameter of not more than 2 microns. If its average diameter exceeds this limit, its sinterability tends to decrease greatly. Preferably, the fine aluminum nitride powder has an average particle diameter of not more than 2 microns and contains at least 70% by volume of particles having a particle diameter of not more than 3 microns.

The aluminum nitride of this invention is very pure as stated above, and its bound oxygen content is preferably at most 1.5% by weight. It was previously believed that a fine powder of aluminum nitride having a bound oxygen content of less than 2% by weight does not have sufficient sinterability and to obtain good sinterability, a bound oxygen content of at least 2% by weight is necessary. In view of this state of art, it is indeed unexpected that the fine aluminum nitride powder having a high density has excellent sinterability.

According to this invention, a sintered body of aluminum nitride having a high purity and a high density can be obtained from the fine aluminum nitride powder of high purity. The sintered body can be produced by molding the fine aluminum nitride powder of this invention, sintering the molded article at a temperature of 1,700° to 2,100° C. in an inert atmosphere to give a sintered body of aluminum nitride having a density of at least 2.9 g/cm$^3$ and containing at least 94% by weight of aluminum nitride, at most 1.5% by weight of bound oxygen, and at most 0.5% by weight of metal compounds as impurities.

Furthermore, according to this invention, the sintered body of aluminum nitride having a high density and a high purity can also be produced by carrying out the sintering step in the above process in the presence of a sintering aid. Such a process can be carried out by molding a fine powder of aluminum nitride containing at least 90% by weight of aluminum nitride, at most 4.5% by weight of bound oxygen, 0.02 to 5.0% by weight as an oxide of the highest atomic valence of at least one metal element selected from the group consisting of alkaline earth metals, lanthanum group metals and yttrium or a compound thereof and at most 0.5% by weight as metal of metallic compounds as impurities other than compounds of the above metals, sintering the resulting molded article at a temperature of 1,600° to 2,100° C. in an inert atmosphere thereby to form a sintered body of aluminum nitride having a aluminum nitride content of at least 90% by weight, a bound oxygen content of at most 3.5% by weight and a density of at least 3.0 g/cm$^3$ and containing 0.02 to 5.0% by weight as an oxide having the highest atomic valence of 0.02 to 5.0% by weight of at least one metal selected from the group consisting of alkaline earth metals, lanthanum group metals and yttrium or a compound thereof and at most 0.5% by weight as metal of metallic compounds as impurities other than compounds of the above metals.

In the above two processes for the production of the sintered body of aluminum nitride of this invention having a high purity and a high density, sintering is carried out by heating the resulting raw molded article at a high temperature in an inert atmosphere. In any of these processes, sintering may be either hot-press sintering or pressureless sintering. In hot-press sintering, the strength of a pressure mold is a limit pressure, and usually pressures of not more than 350 kg/cm$^2$ are selected. Industrially, pressures of at least 20 kg/cm$^2$, preferably 50 to 300 kg/cm$^2$, are used. Pressureless sintering is carried out in the substantial absence of pressure without application of any mechanical pressure to the molded article. When pressureless sintering is carried out, the raw molded article is prepared under a pressure of at least 200 kg/cm$^2$, preferably 500 to 2,000 kg/cm$^2$. Sintering is carried out in an inert atmosphere, particularly a non-oxidizing atmosphere, for example in an atmosphere of nitrogen.

The sintering temperature is 1,700° to 2,100° C., preferably 1,800° to 2,000° C., in the first process not involving the use of a sintering aid. In the second process using a sintering aid, the sintering can be carried out at lower temperatures, specifically 1,600° to 2,100° C., preferably 1,650° to 2,000° C.

Thus, according to this invention, there is provided a sintered body of aluminum nitride having a high purity and a high density having an impurity content of at most 0.5% by weight as metal and a density of at least 3.0 g/cm² (about 92% of theory).

Thus, the sintered body of aluminum nitride having a high purity and a high density provided by this invention is firstly a fine powder of aluminum nitride having a density of at least 2.9 g/cm³, preferably at least 3.0 g/cm³ (corresponding to about 92% of theory), more preferably at least 3.16 g/cm³ (corresponding to about 97% of theory) and containing at least 94% by weight, preferably at least 97% by weight, of aluminum nitride, at most 1.5% by weight, preferably at most 0.75% by weight, of bound oxygen, and at most 0.5% by weight, preferably at most 0.3% by weight, as metal of metal compounds as impurities. Secondly, from a starting material batch containing a sintering aid, there can be obtained a powder of aluminum nitride having a density of at least 3.0 g/cm³, preferably at least 3.16 g/cm³ and containing at least 90% by weight, preferably at least 93% by weight, of aluminum nitride, at most 3.5% by weight, preferably at most 2.5% by weight, of bound oxygen, 0.02 to 5% by weight, preferably 0.05 to 3.0% by weight, as an oxide having the highest atomic valence of at least one metal element selected from the group consisting of alkaline earth metals, lanthanum group metals and yttrium derived from the sintering aid or a compound thereof and at most 0.5% by weight, preferably at most 0.3% by weight, as metal of metallic compounds as impurities other than compounds of the above metals.

In the sintered body of this invention, the impurities can be compounds of metals such as manganese, iron, chromium, nickel, cobalt, copper and zinc or compounds of silicon or carbon originating from the impurities in the fine aluminum nitride powder of this invention.

The sintered body of this invention in its especially preferred form contains at most 0.1% by weight in total as metal of impurities when the impurities are iron, chromium, nickel, cobalt, copper, zinc and titanium.

The sintered body of this invention is characterized by the fact that the state of its mechanically fractured surface quite differs from that of a fractured surface of a conventional sintered body.

The mechanically fractured surface of the high-density aluminum nitride sintered body of the invention is formed of closely packed fine crystal grains which are distinct from each other by clear contours. The clear contours of the fine crystal grains at the fractured surface are polygonal. At least 70% of the fine crystal grains consists of crystal grains having an average particle diameter at the fractured surface defined by the clear contours, $\overline{D}$ ($\mu$m), of 0.5 $\overline{D}$ to 1.5 $\overline{D}$. An aluminum nitride sintered body giving a fractured surface where at least 70% of the crystal grains have a particle size in the range of 0.5 $\overline{D}$ to 1.5 $\overline{D}$, that is an aluminum nitride sintered body having particles of relatively uniform size on the fractured surface, has not been known in the past.

Figure 3:
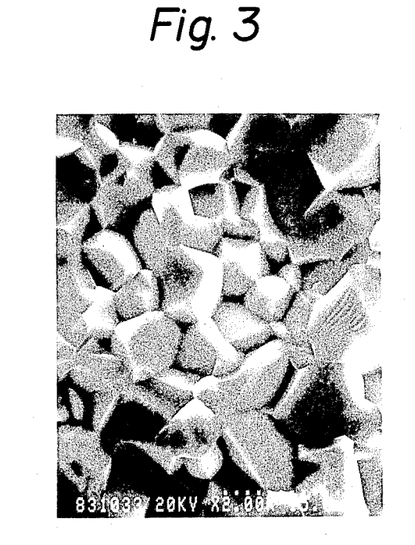
FIG. 3 is a scanning electron microphotograph of the mechanically fractured surface of an example of the hot-press sintered body of the invention.

For example, the sintered body of this invention which gave the microphotograph of FIG. 3 has an average particle diameter ($\overline{D}$) of 6.9 microns, and the proportions of particles having an average particle diameter of 0.5 $\overline{D}$ to 1.5 $\overline{D}$, i.e. 3.5 microns to 10.4 microns, is 83%. Another characteristic of the appearance of the sintered body of this invention at its mechanically fractured surface is that a crystal surface appearing on the fractured surface of the individual particles forms a relatively smooth flat surface. This shows that the sintered body of this invention scarcely contains a foreign phase (appearing usually as a circular depression on the fractured surface) which is formed owing to the inclusion of impurities or a gas phase.

Still another characteristic of the sintered body of this invention is observed in a treated fractured surface which is obtained by treating a mechanically fractured surface with an aqueous solution of phosphoric acid for testing the texture of the sintered body or the state of existence of a secondary phase. Specifically, even after the sintered body of this invention has been treated under most typical treating conditions, that is to say, treated with a 35% aqueous solution of phosphoric acid at 62.5°±2.5° C. for 20 minutes, it still has crystal grains with polygonal angular contours. When the teating conditions are made severer, and the hot-pressed sintered body of this invention is treated with a 50% aqueous solution of phosphoric acid at the same temperature as above for 30 minutes, it still shows the same treated fractured surface as above. On the other hand, the sintered body of the invention obtained by pressureless sintering, when subjected to these treating conditions, is seen to have a vanished portion in the grain boundary surface of the crystal grains, which seems to be the result of dissolving. More specifically, most of the crystal grains have an angular contour, but some of the crystal grains have a somewhat deformed contour not observed before the treatment.

The aforesaid behavior of the sintered body of this invention which resists treatment with an aqueous solution of phosphoric acid is very characteristic in view of the fact that when a conventional aluminum nitride sintered body is treated with an aqueous solution of phosphoric acid, a secondary phase consisting mainly of an oxide is easily dissolved away and therefore the crystal grains have a roundish contour greatly different from the contour of the crystal grains before the treatment. Furthermore, in view of the fact that few reports have been made previously about the successful pressureless sintering of aluminum nitride, it is indeed surprising that the sintered body of this invention produced by pressureless sintering has excellent resistance to an aqueous solution of phosphoric acid as stated above.

An X-ray diffraction pattern of the sintered body of this invention shows six clear diffraction lines assigned to hexagonal aluminum nitride crystals at a diffraction angle (2$\theta$) between 30° and 70°, i.e. at diffraction angles of 33.3°±0.5°, 36.2°±0.5°, 38.1°±0.5°, 49.8°±0.5°, 59.6°±0.5°, and 66.3°±0.5°. These diffraction angles correspond to the Bragg's interplanar specings (d, Å) of 2.69±0.04 Å, 2.48±0.03 Å, 2.36±0.03 Å, 1.83±0.02 Å, 1.55±0.01 Å, and 1.41±0.01 Å, respectively.

It has been reported that conventional aluminum nitride sintered bodies have diffraction lines assigned, for example, to CaO Al$_2$O$_3$, CaO.2Al$_2$O$_3$ or 3Y$_2$O$_3$.5Al$_2$O$_3$ crystals in addition to those assigned to the hexagonal aluminum nitride crystals, because of the large amounts of sintering aids (such as CaCO$_3$ or Y$_2$O$_3$) added for increased sinterability, and the high oxygen content of the starting aluminum nitride. Even when such sintering aids are used in the sintering process, the present invention can provide an aluminum nitride sintered body of high purity and high density which does not substantially show diffraction lines of the aforesaid crystals derived from the sintering aids.

The fine aluminum nitride powder or its intimate mixture containing a sintering aid to be used in the aforesaid second sintering method using the sintering aid can be produced in accordance with this invention firstly by a process which comprises intimately mixing the fine aluminum nitride powder of this invention having a high purity with a compound of at least one metal selected from the group consisting of alkaline earth metals, lanthanum group metals and yttrium in such proportions that the amount of the metal compound becomes 0.02 to 5.0% by weight as a metal oxide having the highest atomic valence based on the total weight of the resulting composition; and secondly by a process which comprises (1) intimately mixing a fine powder of alumina having an average particle diameter of not more than 2 microns, a fine powder of carbon having an ash content of at most 0.2% by weight and an average particle diameter of not more than 1 micron and a compound of a metal selected from the group consisting of alkaline earth metals, lanthanum group metals and yttrium in a liquid medium, the weight ratio of the fine alumina powder to the fine carbon powder being from 1:0.36 to 1:1 and the amount of the metal compound being 0.02 to 5.0% by weight as a metal oxide having the highest atomic valence, (2) firing the resulting intimate mixture at a temperature of 1,400° to 1,700° C. in an atmosphere of nitrogen or ammonia after it is optionally dried, and (3) thereafter heating the mixture at a temperature of 600° to 900° C. in an atmosphere containing oxygen to remove the unreaced carbon.

The first process can be carried out by mixing the fine aluminum nitride powder of the invention with the sintering aid by using a mixing device of the type exemplified hereinabove for mixing alumina and carbon. The second process can be carried out by mixing alumina, carbon and the sintering aid using the same mixing device [step (1)], and then performing steps (2) and (3) in the same way as in the aforesaid process for producing the fine aluminum nitride powder of this invention. The second process is very effective because in many cases dissipation of the sintering aid is unexpectedly little despite the high firing temperature of 1,400° to 1,700° C.

The sintering aid used in the above process is a compound of at least one metal selected from the group consiting of alkaline earth metals, lanthanum group metals and yttrium. It has previously been known that these metal oxides are effective sintering aids for aluminum nitride. Investigations of the present inventors have shown that these metal compounds function not only as sintering aids, but also as light-transmitting property improvers for improving the light-transmitting property of the sintered body of aluminum nitride coupled with the high purity of the fine aluminum nitride powder of this invention.

The alkaline earth metals may include beryllium, magnesium, calcium, strontium and barium. Of these, calcium, strontium and barium function especially well as light-transmitting property improvers.

Examples of the lanthanum group metals include lanthanum, cerium, praseodymium, neodymium, promethium, samarium, europium, gadolinium, terbium, dysprosium, holmium, erbium, thulium, ytterbium and lutetium. Of these, lanthanum, neodymium and cerium are preferred.

The sintering aid or light-transmitting property improver is used in an amount of 0.02 to 5.0% by weight, preferably 0.03 to 3.0% by weight.

Thus, according to this invention, there is provided an intimate composition of fine powder of aluminum nitride comprising at least 90% by weight, preferably at least 93% by weight of aluminum nitride, at most 4.5% by weight, preferably at most 3.0% by weight, of bound oxygen, 0.02 to 5.0% by weight, preferably 0.03 to 3.0% by weight, as an oxide having the highest atomic valence of at least one metal element selected from the group consisting of alkaline earth metals, lanthanum group metals and yttrium or a compound thereof, and at most 0.5% by weight, preferably at most 0.3% by weight, of metal compounds as impurities other than compounds of the aforesaid metals.

In this composition, the impurities may be compounds of metals such as manganese, iron, chromium, nickel, cobalt, copper or zinc or compounds of carbon or silicon which originate from the impurities present in the fine aluminum nitride powder of the invention.

When the metals of the metal compounds as impurities are iron, chromium, nickel, cobalt, copper, zinc and titanium, the content of these impurities is preferably at most 0.1% by weight as the total amount of these metals.

As stated above in detail, the present invention provides a fine powder of aluminum nitride having a high purity and an average particle diameter of not more than 2 microns and a sintered body of aluminum nitride having a high purity and a high density.

The sintered body of aluminum nitride in accordance with this invention is utilized, for example, as highly heat-conducting ceramics in heat releasing plates, materials for heat exchangers, substrates of stereophonic systems or video amplifiers, and substrates of IC. By utilizing its excellent light-transmitting property, it can be used as a window material for sensors using ultraviolet light and infrared light and light-emitting tubes of lamps. It can also be used as a window material for radars utilizing its electric wave transmitting property and as a special window material which requires light-transmitting property at high temperatures.

The fine aluminum nitride powder of this invention is suitably used as a raw material for Sialon-type materials and when used as a raw material for alpha-Sialon, beta-Sialon and AlN polytypes, it gives Sialon compounds having high purity and excellent properties which cannot be obtained with conventional AlN powders. Furthermore, when it is used as a raw material for beta-Sialon, $Al_2O_3$-AlN spinel and silicon oxynitride glass, it gives products having improved light-transmitting property.

Since the fine aluminum nitride powder of this invention is uniform and has good dispersibility, it can be effectively used also as an addition aid in various ceramics such as silicon carbide or as a powder for making a composite with a polymer such as a silicone rubber.

The following examples illustrate the present invention more specifically.

The following various analyzing methods and devices were used in these examples.

Cation analysis

IPC emission spectroanalyzer (ICP-AES, made by Daini Seikosha Co., Ltd.).

Carbon analysis

Carbon analyzer in metal (EMIA-3200, made by Horiba Seisakusho Co., Ltd.).

Oxygen analysis

Oxygen analyzer in metal (EMGA-1300, made by Horiba Seisakusho Co., Ltd.).

Nitrogen analysis

Neutralization titration of ammonia generated by alkali fusion decomposition.

X-ray diffraction device

X-ray diffractometer (JRX-12VB, made by Nippon Denshi Co., Ltd.).

Scanning electron microscope

JSM-T200, made by Nippon Denshi Co., Ltd.).

Specific surface area

BET method (Rapid Surface Area Measuring Device (SA-100, made by Shibata Chemical Machinery, Co., Ltd.).

Device for measuring average particle size and particle size distribution

Centrifugal automatic particle analyzer (CAPA-500, made by Horiba Seisakusho Co., Ltd.).

Thermal conductivity measuring device

Thermal constants measurement analyzer by laser (PS-7, made by Rigaku Denki Co., Ltd.).

Light transmission measuring devices

Hitachi 200-10 UV-VIS Spectrophotometer (330 type) and Hitachi 260-30 Infrared Spectrophotometer 260-30 type).

Flexural strength tester

Instron testing machine (Model 1123).

The light transmittance of a sintered body of aluminum nitride was calculated from the following equation.

$$\frac{I}{I_o} = (1 - R)^2 e^{-\mu t} \quad (1)$$

wherein $I_o$ is the intensity of the incident light, I is the intensity of the transmitted light, R is reflectivity, t is the thickness of the sintered body and $\mu$ is the absorption coefficent. R is determined depending upon the refractive index of the sintered body. Let the refractive index be n, R is given by the following equation in the case of the measurement in air.

$$R = \frac{(1 - n)^2}{(1 + n)^2} \quad (2)$$

$\mu$ in equation (1) is a measure of the light transmitting property of the sintered body, and in the following examples values of $\mu$ were calculated in accordance with equation (1).

Average diameter ($\overline{D}$) at a mechanically fractured surface

A sample of an aluminum nitride sintered body was mechanically fractured, and the fractured surface was photographed through a scanning electron microscope at 2,000 magnifications. The equivalent diameters (d) of the individual crystal grains observed in a photograph having a size of about 7 cm × about 10 cm were measured. The diameter d can be determined by measuring the maximum length ($d_{max}$) and the minimum length ($d_{min}$) of each of the crystal grains which cross its clear contour in the surface of the photograph, and calculating the arithmetic means of the measured maximum and minimum lengths.

From n d values of n crystal grains, the average particle diameter $\overline{D}$ can be calculated in accordance with the following equation.

$$\overline{D} = \frac{\sum_{i=1}^{n} d_i}{n}$$

EXAMPLE 1

Twenty grams of alumina having a purity of 99.99% (Table 1 shows the analyzed values of impurities) and an average particle diameter of 0.52 microns with the proportion of particles having a particle diameter of not more than 3 microns being 95% by weight and 10 g of carbon black having an ash content of 0.08% by weight and an average particle diameter of 0.45 micron were mixed uniformly in ethanol as a dispersing medium in a ball mill composed of a nylon pot and nylon-coated balls. The resulting mixture was dried, put in a flat tray made of highly pure graphite, and heated at 1,600° C. for 6 hours in an electric furnace while continuously feeding nitrogen gas into the furance at a rate of 3 liters/min. The reaction mixture obtained was heated at 750° C. in air for 4 hours to remove the unreacted carbon by oxidation.

X-ray diffraction analysis of the resulting white powder showed that it is single-phase AlN with no diffraction peak of alumina. The resulting powder had an average particle diameter of 1.31 microns, and the proportion of particles having a particle diameter of not more than 3 microns was 90% by volume. Observation by a scanning electron microscope showed that this powder consisted of uniform particles having an average particle diameter of 0.7 micron. It had a specific surface area of 4.0 m²/g.

The analysis values of this powder are shown in Table 2.

TABLE 1

Analysis values of Al$_2$O$_3$ powder
Al$_2$O$_3$ content: 99.99%

| Element | Content (ppm) |
|---|---|
| Mg | <5 |
| Cr | <10 |
| Si | 30 |
| Zn | <5 |
| Fe | 22 |
| Cu | <5 |
| Ca | <20 |
| Ni | 15 |
| Ti | <5 |

TABLE 2

Analysis values of AlN powder
AlN content: 97.8%

| Element | Content |
|---|---|
| Mg | <5 (ppm) |
| Cr | 21 (ppm) |
| Si | 125 (ppm) |
| Zn | 9 (ppm) |
| Fe | 0 (ppm) |
| Cu | <5 (ppm) |

TABLE 2-continued

Analysis values of AlN powder
AlN content: 97.8%

| Element | Content |
|---------|---------|
| Mn | 5 (ppm) |
| Ni | 27 (ppm) |
| Ti | <5 (ppm) |
| Co | <5 (ppm) |
| Al | 64.8 (wt. %) |
| N | 33.4 (wt. %) |
| O | 1.1 (wt. %) |
| C | 0.11 (wt. %) |

EXAMPLE 2

Aluminum nitride power (1.0 g) obtained in the same way as in Example 1 was put in a BN-coated graphite die having a diameter of 20 mm, and hot-pressed at 2,000° C. for 2 hours under a pressure of 100 kg/cm$^2$ in nitrogen gas under 1 atmosphere in a high-frequency induction furnace. The resulting sintered body was slightly yellowish, dense and semi-transparent. The sintered body had a density of 3.26 g/cm$^3$. X-ray diffraction analysis showed that it is single-phase AlN. The analysis values of the sintered body are shown in Table 3. The sintered body had a thermal conductivity of 75 W/m-K. When this sintered body was polished to a thickness of 0.5 mm, its light transmittance to light having a wavelength of 6 μm was 16% (coefficient of absorption μ=34 cm-$^1$).

A disc having a diameter of 40 mm and a thickness of about 3 mm obtained by hot-pressing under the same conditions as above was cut to form a rectangular bar having a size of 3.8×3×35 mm. The three-point bending strength of this sample was measured at a crosshead speed of 0.5 mm/min. and a temperature of 1,200° C. with a span of 30 mm. It was 41.5 kg/mm$^2$ on an average.

TABLE 3

Analysis values of sintered AlN

AlN content: 98.1%

| Element | Content |
|---------|---------|
| Mg | <5 (ppm) |
| Cr | 15 (ppm) |
| Si | 110 (ppm) |
| Zn | 16 (ppm) |
| Fe | 18 (ppm) |
| Cu | <5 (ppm) |
| Mn | 5 (ppm) |
| Ni | 30 (ppm) |
| Ti | <5 (ppm) |
| Co | <5 (ppm) |
| Al | 65.0 (wt. %) |
| N | 33.5 (wt. %) |
| O | 0.6 (wt. %) |

TABLE 3-continued

Analysis values of sintered AlN
AlN content: 98.1%

| Element | Content |
|---------|---------|
| C | 0.13 (wt. %) |

EXAMPLE 3

Figure 1:
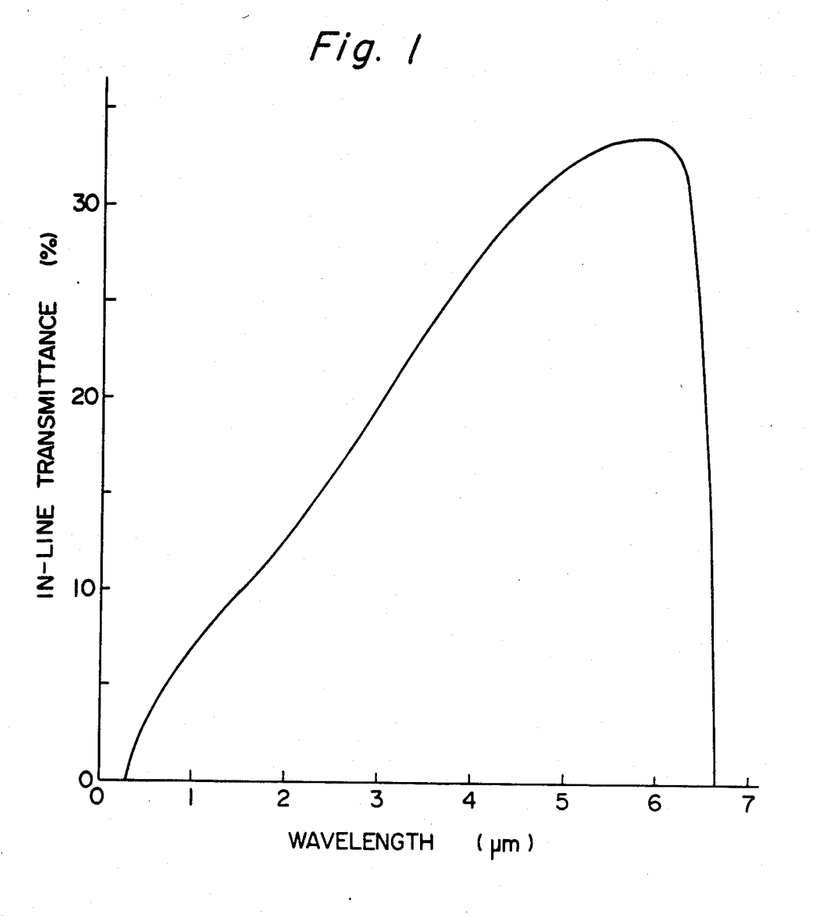
FIG. 1 shows the dependence of the light transmittance of the sintered body of the invention upon the wavelengths of light.
Figure 2:
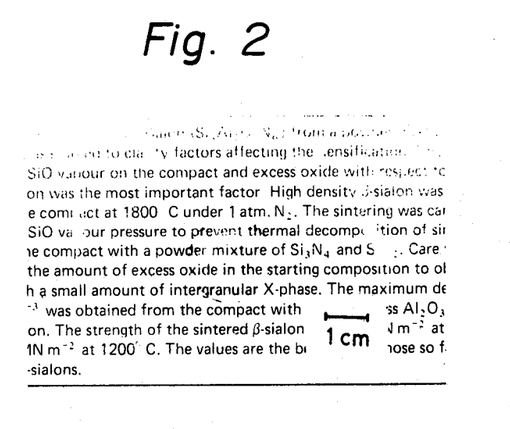
FIG. 2 is a photograph to show the transparency of the centered body demonstrating that the print can be read through the transparent body when it is placed over a printed page.

Aluminum nitride powder (10 g) obtained in the same way as in Example 1 was mixed with 0.2% by weight as CaO of Ca(NO$_3$)$_2$.4H$_2$O using ethanol as a liquid medium in a polyethylene mortar using a pestle made of polyethylene. The mixture was dried and then hot-pressed under the same conditions as in Example 2 to form a sintered body having a diameter of 20 mm. The sintered body has a density of 3.28 g/cm$^3$, and was found to be single-phase AlN by X-ray diffraction analysis. The sintered body had an AlN content of 97.8% by weight, an oxygen content of 0.7% by weight and a thermal conductivity of 79 W/m-K. When the sintered body was polished to a thickness of 0.5 mm, it had a light transmittance to light having a wavelength of 6 m of 33% (coefficient of absorption μ=19 cm$^{-1}$). FIG. 1 shows the dependence of the light transmittance of this sintered body upon wavelengths of light, and FIG. 2 shows a photograph illustrating the transparency of the sintered body.

The mixed AlN powder was sintered by the same procedure as in Example 2, and its 3-point bending strength was measured. It was 45.1 kg/mm$^2$ on an average at 1,200° C.

EXAMPLE 4

Aluminum nitride powder (10 g) obtained by the same method as in Example 1 was mixed with each of the various additives shown in Table 4. The resulting mixtures were each hot-pressed by the same method as in Example 3 to obtain sintered bodies. The results are shown in Table 4.

TABLE 4

| | | Amount added | Sintered body | | | |
|---|---|---|---|---|---|---|
| Run No. | Additive | (% as oxide) | AlN content (%) | Oxygen content (%) | Density (g/cm$^3$) | μ (cm$^{-1}$) |
| 1 | CaO | 1.0 | 97.5 | 0.7 | 3.27 | 23 |
| 2 | Ba(NO$_3$)$_2$ | 0.08 | 98.3 | 0.5 | 3.25 | 22 |
| 3 | Sr(NO$_3$)$_2$ | 0.5 | 98.1 | 0.6 | 3.26 | 23 |
| 4 | Y(NO$_3$)$_3$.6H$_2$O | 0.5 | 98.1 | 0.5 | 3.26 | 20 |
| 5 | La(NO$_3$)$_3$.6H$_2$O | 0.5 | 98.3 | 0.5 | 3.26 | 25 |
| 6 | Nd(NO$_3$)$_3$.6H$_2$O | 0.5 | 98.1 | 0.7 | 3.26 | 27 |
| 7 | CeO$_2$ | 1.0 | 97.3 | 0.8 | 3.28 | 24 |
| 8 | BeO | 0.5 | 98.3 | 0.7 | 3.27 | 30 |

EXAMPLE 5

About 1 g of aluminum nitride powder obtained by the same method as in Example 1 was uniaxially pressed in a die having a diameter of 20 mm and isotactically pressed under a pressure of 1000 kg/cm$^2$ to produce a molded article having a density of 1.56 g/cm$^3$. The molded article was put in a boron nitride crucible and heated at 1,900° C. for 3 hours in nitrogen gas under 1 atmosphere in a high-frequency induction furnace using a graphite heat generator. The resulting sintered body obtained by pressureless sintering was grayish white and had a density of 2.93 g/cm$^3$. X-ray diffraction analysis showed that it was single-phase AlN. Analysis of the sintered body showed that it had an AlN content of 98.3% by weight and an oxygen content of 0.4% by weight. It had a thermal conductivity of 48 W/m-K.

EXAMPLE 6

Ten grams of aluminum nitride powder obtained by the same method as in Example 1 was mixed uniformly with 3.0% by weight as CaO of $Ca(NO_3)_2 \cdot 4H_2O$ in ethanol as a dispersing medium. The mixture was dried, and molded and sintered in the same way as in Example 5. Before sintering, the molded article had a density of 1.73 g/cm$^3$. The sintered body was yellowish and semi-transparent and had a density of 3.23 g/cm$^3$. The sintered body had an AlN content of 96.0% by weight, an oxygen content of 1.5% by weight and a thermal conductivity of 64 W/m-k. When it was polished to a thickness of 0.5 mm, it had a light transmittance to light having a wavelength of 6 $\mu$m of 28% ($\mu = 23$ cm$^{-1}$).

EXAMPLE 7

Ten grams of aluminum nitride powder obtained by the same method as in Example 1 was mixed with each of the various additives indicated in Table 5 in the same way as in Example 6. The mixtures were each subjected to pressureless sintering under the same sintering conditions and in the same device as used in Example 5. The results are shown in Table 5.

TABLE 5

| Run No. | Additive | Amount added (% as oxide) | Sintering temperature (°C.) | Sintered body AlN content (%) | Oxygen content (%) | Density (g/cm$^3$) | $\mu$ (cm$^{-1}$) |
|---|---|---|---|---|---|---|---|
| 1 | CaCO$_3$ | 4.0 | 1900 | 95.0 | 1.5 | 3.20 | 43 |
| 2 | Ba(NO$_3$)$_3$ | 2.0 | 1850 | 96.3 | 0.8 | 3.19 | 68 |
| 3 | Y(NO$_3$)$_3 \cdot$6H$_2$O | 1.0 | 2000 | 96.9 | 0.7 | 3.11 | 48 |
| 4 | La(NO$_3$)$_3 \cdot$6H$_2$O | 3.0 | 1900 | 95.5 | 1.0 | 3.26 | 40 |
| 5 | CeO$_2$ | 3.0 | 1900 | 95.6 | 1.0 | 3.24 | 45 |

EXAMPLE 8

The same alumina (20 g) and carbon (8 g) as used in Example 1 were uniformly mixed in water as a dispersing medium in a ball mill composed of a nylon pot and balls. The mixture was dried, put in a flat tray made of highly pure graphite, and heated at 1,550° C. for 6 hours in a furnace while continuously feeding nitrogen gas into the furnace at a rate of 3 liters/min. The reaction mixture was heated at 800° C. in the air for 4 hours to remove the unreacted carbon. The resulting powder had an AlN content of 95.8% by weight and an oxygen content of 2.1% by weight. The amount of cationic impurities in the AlN powder were nearly on the same level as those shown in Table 2 in Example 1. The resulting powder had an average particle diameter of 1.22 microns and contained 92% by volume of particles having a particle diameter of not more than 3 microns.

EXAMPLE 9

One gram of AlN powder obtained by the same method as in Example 8 was hot-pressed in the same device and under the same conditions as used in Example 2. The resulting sintered body was slightly yellowish and semi-transparent and had a density of 3.25 g/cm$^3$, an AlN content of 96.8% by weight and an oxygen content of 1.3% by weight. The sintered body had a thermal conductivity of 52 W/m-k. When the sintered body was polished to a thickness of 0.5 mm, it had a light transmittance to light having a wavelength of 6 $\mu$m of 11% ($\mu = 41$ cm$^{-1}$). The bending strength of the sintered body, measured under the same conditions in Example 2, was 35.5 kg/mm$^2$ on an average at 1,200° C.

EXAMPLE 10

Ten grams of AlN powder obtained by the same method as in Example 8 was mixed with 0.5% by weight as Y$_2$O$_3$ of Y(NO$_3$)$_3 \cdot$6H$_2$O in ethanol as a liquid medium. The mixture (1 g) was dried, and then hot-pressed at 1,400° C. and 200 kg/cm$^2$ for 2 hours in vacuum using the same device as used in Example 2. The resulting sintered body was semi-transparent and had a density of 3.27 g/cm$^3$, an AlN content of 96.5% by weight, an oxygen content of 1.5% by weight and a thermal conductivity of 56 W/m-k. When the sintered body was polished to a thickness of 0.5 mm, it had a light transmittance to light having a wavelength of 6 $\mu$m of 20% ($\mu = 29$ cm$^{-1}$).

EXAMPLE 11

Ten grams of AlN powder obtained by the same method as in Example 8 was mixed uniformly with 4.0% by weight as CaO of Ca(NO$_3$)$_2 \cdot$4H$_2$O in ethanol as a liquid dispersing medium. The mixture (1 g) was dried and then subjected to pressureless sintering under the same sintering conditions and in the same deviced as used in Example 5. The sintered body obtained was yellowish and semi-transparent and had a density of 3.20 g/cm$^3$, an AlN content of 94.2% by weight, an oxygen content of 2.5% by weight and a thermal conductivity of 42 W/m-k. When the sintered body was polished to a thickness of 0.5 mm, it had a light transmittance to light having a wavelength of 6 $\mu$m of 10% ($\mu = 43$ cm$^{-1}$).

EXAMPLE 12

Twenty grams of alumina having a purity of 99.3% and an average particle diameter of 0.58 micron and 16 g of carbon black having an ash content of 0.15% by weight and an average particle diameter of 0.44 micorn were uniformly mixed in hexane as a dispersing medium using a nylon pot and balls. The mixture was dried, put in a flat tray made of highly pure graphite, and heated in a furnace at 1,650°C. for 6 hours while continuously feeding ammonia gas into the furnace at a rate of 1 liter/min. The resulting reaction mixture was heated in the air at 750° C. for 6 hours to remove the unreacted carbon by oxidation. The resulting powder had an average particle diameter of 1.42 microns with the proportion of particles having a particle diameter of not more than 3 microns being 84% by volume.

The powder was analyzed, and the results are shown in Table 6.

TABLE 6

Analysis values of AlN powder
AlN content: 96.9% by weight

| Element | Content |
|---|---|
| Mg | 48 (ppm) |
| Cr | 110 (ppm) |
| Si | 2500 (ppm) |
| Zn | 20 (ppm) |
| Fe | 370 (ppm) |
| Cu | <5 (ppm) |
| Mn | 40 (ppm) |
| Ni | 120 (ppm) |
| Ti | 25 (ppm) |
| Co | <5 (ppm) |
| Al | 64.9 (wt. %) |
| N | 33.1 (wt. %) |
| O | 1.3 (wt. %) |
| C | 0.16 (wt. %) |

EXAMPLE 13

One gram of AlN powder obtained by the same method as in Example 12 was hot-pressed under the same sintering conditions and in the same device as used in Example 2. The resulting sintered body was grayish and semi-transparent and had a density of 3.26 g/cm$^3$, an AlN content of 97.9% by weight, an oxygen content of 0.8% by weight and a thermal conductivity of 50 W/m-k. When this sintered body was polished to a thickness of 0.5 mm, it had a light transmittance to light having a wavelength of 6 $\mu$m of 6% ($\mu$=53 cm$^{-1}$).

EXAMPLE 14

Ten grams of AlN powder obtained by the same method as in Example 12 was uniformly mixed with 0.2% by weight as BaO of Ba(NO$_3$)$_2$ in ethanol as a liquid medium. The mixed powder (1 g) was dried, and then hot-pressed under the same sintering conditions and in the same device as used in Example 2. The resulting sintered body was grayish and semi-transparent, and had a density of 3.27 g/cm$^3$, an AlN content of 97.9% by weight, an oxygen content of 0.9% by weight and a thermal conductivity of 55 W/m-k. When it was polished to a thickness of 0.5 mm, it had a light transmittance to light having a wavelength of 6 $\mu$m of 8% ($\mu$=48 cm$^{-1}$).

EXAMPLE 15

The same alumina (130 g; purity 99.99% by weight) and carbon black (65 g; ash content 0.08% by weight) as used in Example 1 and 1.0 g of calcium carbonate having an average particle diameter of 3 microns were uniformly mixed in ethanol as a dispersing medium in a ball mill consisting of a pot and balls coated with polyurethan resin. The mixture was dried, and then reacted and oxidized under the same conditions as in Example 1 to form an AlN powder. The resulting powder had an average particle diameter of 1.44 microns and contained 86% by volume of particles having a particle diameter of not more than 3 microns. The analysis values of the powder are shown in Table 7.

TABLE 7

Analysis values of AlN powder
AlN content: 96.9% by weight

| Element | Content |
|---|---|
| Ca | 920 (ppm) |
| Mg | <5 (ppm) |
| Cr | 17 (ppm) |
| Si | 86 (ppm) |

TABLE 7-continued

Analysis values of AlN powder
AlN content: 96.9% by weight

| Element | Content |
|---|---|
| Zn | 12 (ppm) |
| Fe | 25 (ppm) |
| Cu | <5 (ppm) |
| Mn | 4 (ppm) |
| Ni | 27 (ppm) |
| Ti | <5 (ppm) |
| Co | <5 (ppm) |
| Al | 65.0 (wt. %) |
| N | 33.1 (wt. %) |
| O | 1.5 (wt. %) |
| C | 0.15 (wt. %) |

EXAMPLE 16

One gram of AlN powder obtained by the same method as in Example 15 was hot-pressed under the same conditions and in the same device as used in Example 2. The resulting sintered body was compact and semi-transparent and had a density of 3.26 g/cm$^3$, an AlN content of 98.1%, an oxygen content of 0.7% and a thermal conductivity of 60 W/m-k. When the sintered body was polished to a thickness of 0.5 mm, it had a light transmittance to light having a wavelength of 6 $\mu$m of 28% ($\mu$=23 cm$^{-1}$).

EXAMPLE 17

The same alumina (130 g; purity 99.99% by weight) and carbon black (65 g; ash content 0.08% by weight) as used in Example 1 were uniformly mixed with 0.52 g of Y$_2$O$_3$ having an average particle diameter of 1 micron in ethanol as a dispersing medium in a ball mill composed of a pot and ball coated with polyurethan resin. The mixture was dried and then reacted and oxidized under the same conditions as in Example 1 to give an AlN powder. The powder had an average particle diameter of 1.50 microns and contained 83% by volume of particles having a particle diameter of not more than 3 microns. The analysis values of this powder are shown in Table 8.

TABLE 8

Analysis values of AlN powder
AlN content: 96.9%

| Element | Content |
|---|---|
| Y | 3360 (ppm) |
| Mg | 6 (ppm) |
| Cr | 11 (ppm) |
| Si | 123 (ppm) |
| Zn | 16 (ppm) |
| Fe | 36 (ppm) |
| Cu | 16 (ppm) |
| Mn | 5 (ppm) |
| Ni | 7 (ppm) |
| Ti | 10 (ppm) |
| Co | <5 (ppm) |
| Al | 64.9 (wt. %) |
| N | 33.1 (wt. %) |
| O | 1.5 (wt. %) |
| C | 0.18 (wt. %) |

EXAMPLE 18

One gram of AlN powder obtained in the same way as in Example 17 was hot-pressed under the same conditions and in the same device as used in Example 2. The resulting sintered body had a density of 3.28 g/cm$^3$, an AlN content of 98.1% by weight, an oxygen content of 0.8% by weight and a thermal conductivity of 63 W/m-k. When it was polished to a thickness of 0.5 mm, it had a transmittance to light having a wavelength of 6 μm of 30% (μ=21 cm⁻¹).

COMPARATIVE EXAMPLE 1

The same alumina (100 g; purity 99.99% by weight) and carbon black (100 g; ash content 0.08% by weight) as used in Example 1 were mixed in the dry state in a ball mill composed of a pot and balls coated with polyurethan resin. The mixture was reacted and oxidized under the same conditions as in Example 1 to obtain AlN powder. The resulting powder was white and had an average particle diameter of 1.8 microns with the proportion of particles having a particle diameter of not more than 3 microns being 62% by volume. The analysis values of the powder are shown in Table 9.

The powder was hot-pressed in the same device and the same sintering conditions as used in Example 2. The sintered body was grayish white and non-transparent, and had a density of 3.12 g/cm³ and a thermal conductivity of 28 W/mk-k. The 3-point bending strength of the sintered body was 20.3 kg/mm² on an average at 1,200° C.

TABLE 9

Analysis values of AlN powder
AlN content: 92.0% by weight

| Element | Content |
| --- | --- |
| Mg | 8 (ppm) |
| Cr | 15 (ppm) |
| Si | 110 (ppm) |
| Zn | 10 (ppm) |
| Fe | 40 (ppm) |
| Cu | 15 (ppm) |
| Mn | 5 (ppm) |
| Ni | 12 (ppm) |
| Ti | 10 (ppm) |
| Co | <5 (ppm) |
| Al | 64.4 (wt. %) |
| N | 31.4 (wt. %) |
| O | 3.8 (wt. %) |
| C | 0.16 (wt. %) |

COMPARATIVE EXAMPLE 2

Twenty grams of alumina having a purity of 99.6% by weight and an average particle diameter of 3.6 microns and 10 g of carbon black having an ash content of 0.08% by weight were mixed in ethanol as a dispersing medium in a ball mill composed of a pot and balls coated with nylon. The mixture was reacted and oxidized in the same device and under the same conditions as in Example 1. The resulting powder was white and had an AlN content of 96.1% by weight, an oxygen content of 1.9% by weight and an average particle diameter of 3.9 microns with the proportion of particles having a particle diameter of not more than 3 microns being 33% by volume.

The powder was hot-pressed in the same device and the same sintering conditions as used in Example 2. The resulting sintered body was grayish and non-transparent and had a density of 2.98 g/cm³ and a 3-point bending strength at 1,200° C. of 24.9 kg/mm² on an average.

COMPARATIVE EXAMPLE 3

Ten grams of AlN powder obtained in the same way as Comparative Example 2 was mixed with 0.2% by weight as CaO of Ca(NO₃)₂.4H₂O in ethanol as a liquid medium. The mixed powder (1 g) was dried and then hot-pressed in the same device and under the same conditions as used in Example 2. The sintered body was gray and non-transparent and had a density of 3.11 g/cm³, a thermal conductivity of 35 W/m-k, and a 3-point bending strength at 1,200° C. of 25.6 kg/mm² on an average.

COMPARATIVE EXAMPLE 4

Twenty grams of alumina having a purity of 98.5% by weight and an average particle diameter of 1.0 micron and 16 g of carbon black having an ash content of 0.15% by weight and an average particle diameter of 0.44 micron were mixed uniformly in ethanol in a ball mill composed of a pot made of nylon and nylon-coated balls. The mixture was reacted and oxidized under the same conditions as in Example 1 to obtain AlN powder. The resulting powder was grayish white and had an average particle diameter of 1.8 microns with the proportion of particles having a particle diameter of not more than 3 microns being 75% by volume. The analysis values of the powder are shown in Table 10.

One gram of this powder was hot-pressed in the same device and under the same sintering conditions as used in Example 2. The resulting sintered body was grayish black and non-transparent and had a density of 3.22 g/cm³ a thermal conductivity of 33 W/m-k and a 3-point bending strength at 1200° C. of 27.4 kg/mm² on an average.

TABLE 10

Analysis values of AlN powder
AlN content: 96.4%

| Element | Content |
| --- | --- |
| Mg | 130 (ppm) |
| Cr | 260 (ppm) |
| Si | 3600 (ppm) |
| Zr | 50 (ppm) |
| Fe | 2100 (ppm) |
| Cu | 10 (ppm) |
| Mn | 50 (ppm) |
| Ni | 310 (ppm) |
| Ti | 180 (ppm) |
| Co | 60 (ppm) |
| Al | 64.6 (wt. %) |
| N | 32.9 (wt. %) |
| O | 1.8 (wt. %) |
| C | 0.13 (wt. %) |

EXAMPLE 19

To 10 g of an aluminum nitride powder obtained in the same way as in Example 1 was added 3% by weight, as CaO, of Ca(NO₃)₂.4H₂O. They were mixed and sintered in the same way as in Example 3. The resulting sintered body had a density of 3.27 g/cm³, an AlN content of 97.5% by weight and an oxygen content of 1.2% by weight.

A 2 mm-thick sample of the sintered body was prepared, and its thermal conductivity was measured in the same way as in the foregoing Examples. Specifically, collidal carbon was spray-coated on both surfaces of the sample of the sintered body, and irradiated with ruby laser. It was found to have a thermal conductivity of 72 W/m-k when measured by a so-called contact method involving measuring the temperature rise of the back surface of the sample by a thermocouple closely adhered to the back surface by means of a silver paste. When a thin film of gold was vacuum-deposited on the laser irradiated surface of the same sample in order to prevent permeation of the laser light, and the temperature rise of the back surface of the sample was measured by a so-called non-contact method involving the use of an indium antimony sensor, its thermal conductivity was 91 W/m-k.

A sample was prepared on the other hand by grinding the above sintered body to a thickness of 0.5 mm. This sample was found to have a linear transmission, to light having a wavelength of 6 μm, of 35% ($\mu = 18$ cm$^{-1}$). Its total light transmission of light having a wavelength of 1 μm was measured by using an integrating sphere having a diameter of 60 mm, and found to be 73%.

A microphotograph of the fractured surface of the sintered body is shown in FIG. 3.

Figure 4:
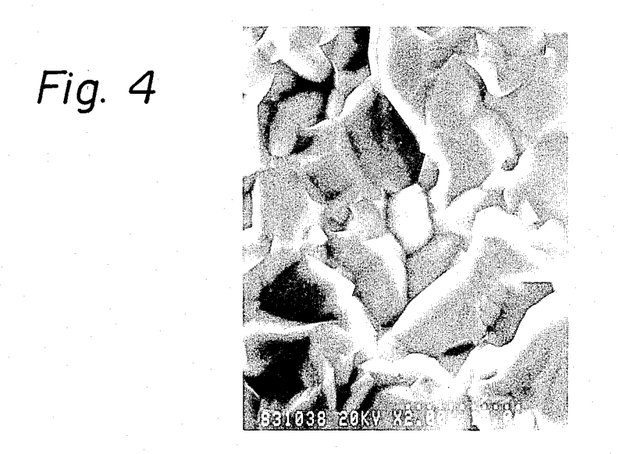
FIG. 4 is a scanning electron microphotograph of the mechanically fractured surface of the same hot-press sintered body of the invention as shown in FIG. 3 which was taken after the fractured surface was treated with an aqueous solution of phosphoric acid.

The fractured surface was etched by treating it with a 50% aqueous solution of phosphoric acid at a temperature of 62.5±2.5° C. for 30 minutes. A microphotograph of the etched surface is shown in FIG. 4.

EXAMPLE 20

Figure 5:
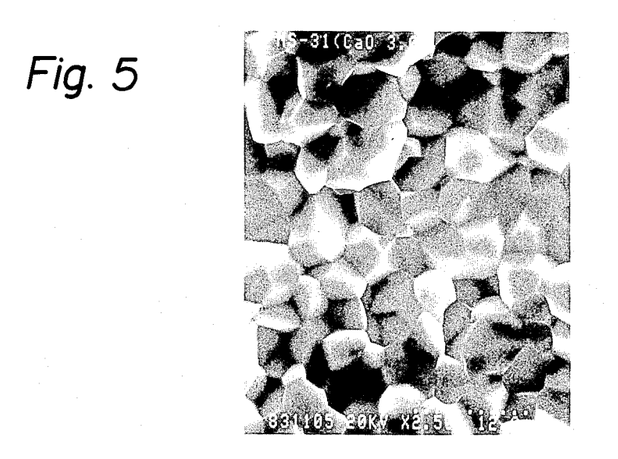
FIG. 5 is a scanning electron microphotograph of a mechanically fractured surface of an example of the pressureless sintered body of the invention.

To 10 g of an aluminum nitride powder obtained in the same way as in Example 1 was added 2% by weight, as CaO, of Ca(NO$_3$)$_2$.4H$_2$O. They were mixed and sintered in the same way as in Example 6. The properties of the resulting aluminum nitride sintered body are tabulated below. A microphotograph of the fractured surface of the resulting aluminum nitride sintered body is shown in FIG. 5.

Density: 3.24 g/cm$^3$
AlN content: 97.0% by weight
O$_2$ content: 1.3% by weight
Thermal conductivity: 73 W/m-k (contact method)
  95 W/m-K (non-contact method)
Light transmission: 33% ($\mu = 19$ cm$^{-1}$) (linear)
  68% (total)

EXAMPLE 21

Example 2 was repeated except that 0.5% as CaO of Ca(NO$_3$)$_2$.4H$_2$O was used. The resulting aluminum nitride sintered body had the properties shown below.

Figure 6:
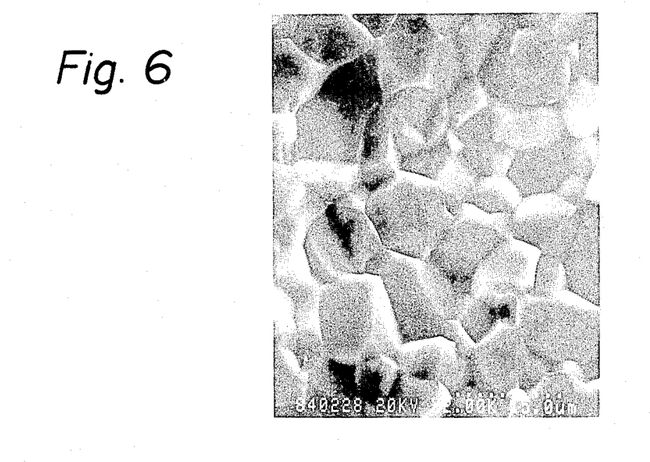
FIG. 6 is a scanning electron microphotograph of a mechanically fractured surface of another example of the pressureless sintered body of the invention.
Figure 7:
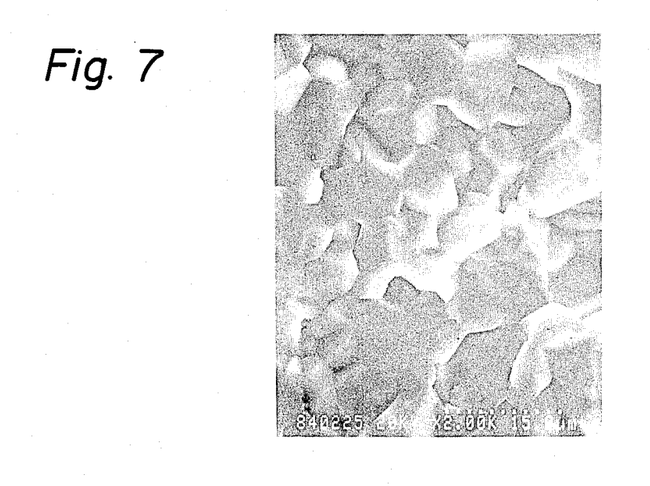
FIG. 7 is a scanning electron microphotograph of the mechanically fractured surface of the same pressureless sintered body of the invention as shown in FIG. 6 which was taken after the fractured surface was treated with an aqueous solution of phosphoric acid.

A microphotograph of the fractured surface of the resulting aluminum nitride sintered body is shown in FIG. 6. A microphotograph of the same fractured surface taken after it was treated with a 50% aqueous solution of phosphoric acid at 62.5±2.5° C. for 30 minutes is shown in FIG. 7.

Density: 3.22 g/cm$^3$
AlN content: 97.3% by weight
O$_2$ content: 1.0% by weight
Thermal conductivity: 75 W/m-k (contact method)
  98 W/m-K (non-contact method)
Light transmission: 31% ($\mu = 21$ cm$^{-1}$) (linear)
  65% (total)

What is claimed is:

1. A fine powder of aluminum nitride
    (a) having an average particle diameter of not more than 2 microns.
    (b) comprising at least 97% by weight of aluminum nitride, and at most 0.5% by weight as metal of metal compounds as impurities, or at most 0.5% by weight, as impurities, of carbon or silicon as carbon or silicon compounds, wherein at most 0.1% by weight of the metal of the metal compounds is selected from the group consisting of iron, chromium, nickel, cobalt, copper, zinc and titanium, and
    (c) containing at most 1.5% by weight of bound oxygen.

2. The fine aluminum nitride powder of claim 1 wherein the content of the metal compounds as impurities is at most 0.3% by weight as metal.

3. The fine aluminum nitride powder of claim 1 which contains at least 70% by volume of particles having a particle diameter of not more than 3 microns.

4. The fine aluminum nitride powder of claim 1 which is composed of spherical particles having an average particle diameter of not more than 2 microns or secondary agglomerates thereof.

5. A process for producing a fine powder of aluminum nitride, which comprises
    (1) intimately mixing a fine powder of alumina having an average particle diameter of not more than 2 microns with a fine powder of carbon having an ash content of at most 0.2% and an average particle diameter of not more than 1 micron in a liquid dispersing medium, the weight ratio of the fine alumina powder to the fine carbon powder being from 1:0.36 to 1:1,
    (2) firing the resulting intimate mixture at a temperature of 1,400° to 1,700° C. in an atmosphere of nitrogen or ammonia after drying it, and
    (3) thereafter heating the resulting fine powder at a temperature of 600° to 900° C. to remove the unreacted carbon, thereby forming a fine powder of aluminum nitride having an average particle diameter of not more than 2 microns and containing at least 94% by weight of aluminum nitride, at most 3% by weight of bound oxygen and at most 0.5% by weight, calculated as metal, of metal compounds as impurities, or at most 0.5% by weight, as impurities, of carbon or silicon as carbon or silicon compounds.

6. The process of claim 5 wherein the fine powder of alumina has a purity of at least 99.0% by weight.

7. The process of claim 5 wherein the weight ratio of the fine alumina powder to the fine carbon powder is from 1:0.4 to 1:1.

8. The process of claim 5 wherein the liquid dispersing medium is water, a hydrocarbon, an aliphatic alcohol, or a mixture of these.

9. a process for producing an intimate composition of a fine powder of aluminum nitride, which comprises
    (1) intimately mixing a fine powder of alumina having an average particle diameter of not more than 2 microns, a fine powder of carbon having an ash content of at most 0.2% by weight and an average particle diameter of not more than 1 micron and a compound of a metal selected from the group consisting of alkaline earth metals, lanthanum group metals and yttrium in a liquid medium, the weight ratio of the fine alumina powder to the fine carbon powder being from 1:0.36 to 1:1 and the amount of the compound of the metal being 0.02 to 5.0% by weight as a metal oxide having the highest atomic valence based on the resulting composition,
    (2) after or without drying the resulting intimate mixture, firing it at a temperature of 1,400° to 1,700° C. in an atmosphere of nitrogen or ammonia, and
    (3) thereafter, heating the resulting fine powder at a temperature of 600° to 900° C. in an atmosphere containing oxygen to remove the unreacted carbon, thereby forming an intimate composition of a fine powder of aluminum nitride comprising at least 93% by weight of aluminum nitride, at most 3% by weight of bound oxygen, 0.02 to 5.0% by weight as an oxide having the highest atomic valence of at least one metal element selected from the group consisting of alkaline earth metals, lanthanum group metals and yttrium or a compound thereof, and at most 0.3% by weight as metal of metal compounds as impurities selected from the group consisting of iron, chromium, nickel, cobalt, copper, zinc and titanium.

10. a process for producing an intimate composition of a fine powder of aluminum nitride, which comprises intimately mixing a fine powder of aluminum nitride having an average particle diameter of not more than 2 microns, comprising at least 97% by weight of aluminum nitride, and at most 0.5% by weight as metal of metal compounds as impurities, wherein at most 0.1% by weight of the metal of the metal compounds is selected from the group consisting of iron, chromium, nickel, cobalt, copper, zinc and titanium, and containing at most 1.5% by weight of bound oxygen with a compound of at least one metal selected from the group consisting of alkaline earth metals, lanthanum group metals and yttrium in such proportions that the content of the compound of said metal is 0.02 to 5.0% by weight as a metal oxide having the highest atomic valence in the resulting composiition, thereby to form an intimate composition of a fine powder of aluminum nitride comprising at least 93% by weight of aluminum nitride, at most 3% by weight of bound oxygen, 0.02 to 5.0% by weight as an oxide having the highest atomic valence of at least one metal element selected from the group consisting of alkaline earth metals, lanthanum group metals and yttrium or a compound thereof, and at most 0.3% by weight as metal of metal compounds as impurities selected from the group consisting of iron, chromium, nickel, cobalt, copper, zinc and titanium.

11. A sintered body of aluminum nitride having a high purity, a high density and light-transmitting properties, said sintered body having a density of at least 3.16 g/cm$^3$ and a light transmittance of at most 68 cm$^{-1}$ calculated from in-line transmittance to light having a wavelength of 6 $\mu$m and comprising at least 94% by weight of aluminum nitride, at most 1.5% by weight of bound oxygen and at most 0.5% by weight as metal of metal compounds as impurities, or at most 0.5%, as impurities, by weight of carbon or silicon as carbon or silicon compounds.

12. The sintered body of claim 1 wherein the content of bound oxygen is at most 0.75% by weight.

13. The sintered body of claim 1 wherein the content of the metal compounds as impurities is at most 0.3% by weight as metal.

14. The sintered body of claim 1 wherein the metal of the metal compounds as impurities is manganese, iron, chromium, nickel, cobalt, copper, zine or titanium.

15. The sintered body of claim 1 wherein the metal of the metal compounds as impurities is iron, chromium, nickel, cobalt, copper, zinc or titanium, and the total amount of these impurities is at most 0.1% by weight as metal.

16. The sintered body of claim 1 wherein the content of aluminum nitride is at least 97% by weight.

17. A process for producing a sintered body of aluminum nitride having a high purity and a high density, which comprises molding a fine powder of aluminum nitride having an average particle diameter of not more than 2 microns, comprising at least 97% by weight of aluminum nitride, and at most 0.5% by weight as metal of metal compounds as impurities, or at most 0.5% by weight, as impurities, of carbon or silicon as carbon or silicon compounds, wherein at most 0.1% by weight of the metal of the metal compounds is selected from the group consisting of iron, chromium, nickel, cobalt, copper, zinc and titanium, and containing at most 1.5% by weight of bound oxygen and sintering the molded article at a temperature of 1,700° to 2,100° C. in an inert atmosphere thereby to form a sintered body of aluminum nitride.

18. The process of claim 17 wherein the sintering is carried out under a pressure of at least 20 kg/cm$^2$.

19. The process of claim 17 wherein the sintering is carried out in an atmosphere of nitrogen.

20. The process of claim 17 wherein the sintering is carried out in the substantial absence of pressure.

21. The process of claim 20 wherein the sintering is carried out in an atmosphere of nitrogen.

22. The proces of claim 17 wherein the sintering is carried out in vacuum.

23. A sintered body of aluminum nitride having a high purity, a high density and light-transmitting properties, said sintered body having a density of at least 3.16 g/cm$^3$ and a light transmittance of at most 68 cm$^{-1}$ calculated from in-line transmittance to light having a wavelength of 6 $\mu$m and comprising at least 93% by weight of aluminum nitride, at most 3% by weight of bound oxygen, 0.02 to 5.0% by weight as an oxide having the highest atomic valence of at least one metal element selected from the group consisting of alkaline earth metals, lanthanum group metals and yttrium or a compound thereof, and at most 0.3% by weight as metal of metal compounds as impurities selected from the group consisting of iron, chromium, nickel, cobalt, copper, zinc and titanium.

24. The sintered body of claim 23 wherein the content of bound oxygen is at most 2.0% by weight.

25. The sintered body of claim 23 wherein the total content of the impurities is at most 0.1% by weight as metal.

26. A process for producing a sintered body of aluminum nitride having high purity and density, which comprise molding, an intimate composition of a fine powder of aluminum nitride comprising at least 93% by weight of aluminum nitride, at most 3% by weight of bound oxygen, 0.02 to 5.0% by weight as an oxide having the highest atomic valence of at least one metal element selected from the group consisting of alkaline earth metals, lanthanum group metals and yttrium or a compound thereof, and at most 0.3% by weight as metal of metal compounds as impurities selected from the group consisting of iron, chromium, nickel, cobalt, copper, zinc and titanium and sintering the molded article at a temperature of 1,600° to 2,100° C. in an inert atmosphere, thereby to form a sintered body of aluminum nitride having a high purity, a high density and light-transmitting Properties, said sintered body having a density of at least 3.16 g/cm$^3$ and a light transmittance of at most 68 cm$^{-1}$ calculated from in-line transmittance to light having a wavelength of 6 $\mu$m and comprising at least 93% by weight of aluminum nitride, at most 3% by weight of bound oxygen, 0.02 to 5.0% by weight as an oxide having the highest atomic valence of at least one metal element selected from the group consisting of alkaline earth metals, lanthanum group metals and yttrium or a compound thereof, and at most 0.3% by weight as metal of metal compounds as impurities selected from the group consisting of iron, chromium, nickel, cobalt, copper, zinc and titanium.

27. The process of claim 26 wherein the sintering is carried out under a pressure of at least 20 kg/cm$^2$.

28. The process of claim 26 wherein the sintering is carried out in an atmosphere of nitrogen.

29. The process of claim 26 wherein the sintering is carried out in the substantial absence of pressure.

30. The process of claim 29 wherein the sintering is carried out in an atmosphere of nitrogen.

31. The process of claim 26 wherein the sintering is carried out in vacuum.

32. A sintered body of aluminum nitride having a high density, a mechanically fractured surface of said sintered body being formed of closely packed fine crystal grains distinct from each other by clear contours, said clear contours of the fine crystal grains at the fractured surface being polygonal, and at least 70% of said crystal grains having a particle diameter in the range of 0.5 $\overline{D}$ to 1.5 $\overline{D}$ wherein $\overline{D}$ in microns is the average particle diameter of the fine crystal grains at said fractured surface defined by the clear contours.

33. The sintered body of claim 32 wherein after the fractured surface has been treated with a 35% aqueous solution of phosphoric acid at 62.5±2.5° C. for 20 minutes, crystal grains having angular contours exist on the treated surface.

34. The sintered body of claim 32 which shows in its X-ray diffraction pattern six clear diffraction lines assigned to hexagonal aluminum nitride crystals at a diffraction angle (2θ) between 30° and 70°, but shows substantially no other diffraction line.

35. The sintered body of claim 32 which is produced by pressure sintering.

36. The sintered body of claim 32 which is produced by pressureless sintering.

* * * * *